Oct. 8, 1946.   L. A. MARQUARDT   2,408,866
RAILWAY CAR TRUCK
Filed May 29, 1943
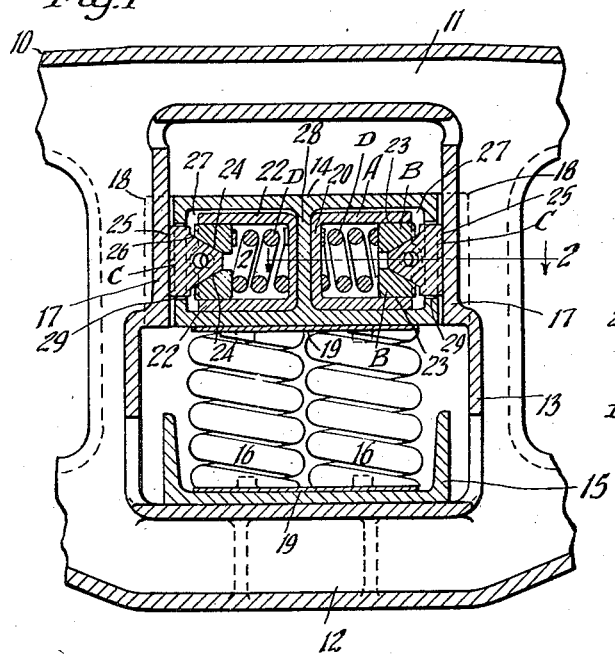
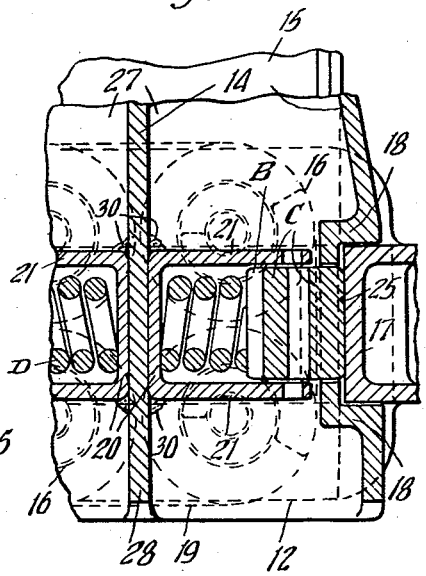
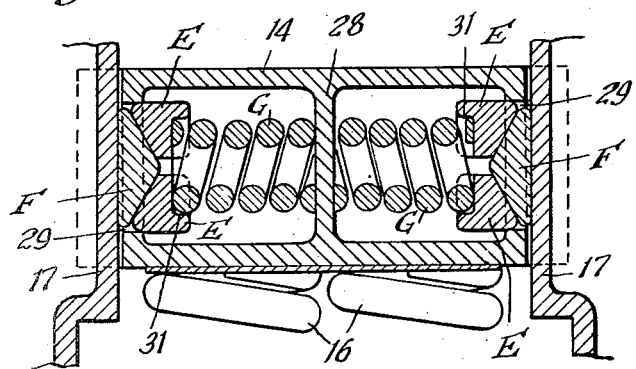
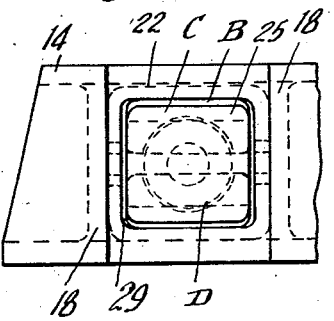
Inventor
Leonard A. Marquardt
By Henry Fuchs
Atty.

Patented Oct. 8, 1946

2,408,866

UNITED STATES PATENT OFFICE 2,408,866

RAILWAY CAR TRUCK

Leonard A. Marquardt, Elmhurst, Ill., assignor to W. H. Miner, Inc., Chicago, Ill., a corporation of Delaware Application May 29, 1943, Serial No. 489,017

7 Claims. (Cl. 105—197)

This invention relates to improvements in railway car trucks.

One object of the invention is to provide in a railway car truck simple and efficient means for snubbing the action of the truck springs, including friction blocks carried by the truck bolster engaging the bolster guides and through frictional contact therewith reducing the oscillations and vibrations of the springs to protect the car body and its lading against damage which would otherwise result.

A more specific object of the invention is to provide friction means for resisting relative upward and downward movement between the bolster of a railway car truck and the side frames to thereby dampen the action of the truck springs, wherein the friction means comprises spring pressed wedge blocks having wedging engagement with friction wedge blocks cooperating with the bolster guides, the wedge and wedge friction blocks being housed within the bolster with the wedge friction blocks projecting from the bolster against the bolster guides.

Other objects of the invention will more clearly appear from the description and claims hereinafter following.

In the drawing forming a part of this specification, Figure 1 is a vertical sectional view, through a portion of a truck of a railway car, in a direction lengthwise of the car, illustrating my improvements in connection therewith, the truck being partly broken away. Figure 2 is a horizontal sectional view, on an enlarged scale, corresponding substantially to the line 2—2 of Figure 1. Figure 3 is a side elevational view of the end portion of the truck bolster illustrated in Figures 1 and 2. Figure 4 is a view similar to Figure 1, on an enlarged scale, of the truck bolster and the adjacent parts of the truck, showing a modification of the invention.

In said drawing, 10 indicates one of the side frame members of a railway car truck. The side frame 10, as shown, is in the form of a casting and has top and bottom members 11 and 12 connected by spaced vertically disposed sections 13—13. As will be understood by those skilled in this art, the truck includes two side frame members 10—10, a truck bolster 14, a channel-shaped spring plank 15, and truck springs 16—16. The opposite ends of the spring plank are supported on the bottom members 12—12 of the truck side frame members 10—10, and the opposite ends of the bolster 14 are guided between the sections 13—13 and 13—13 of the truck side frames.

As shown most clearly in Figures 1, 2, and 4, the sections 13—13 are inwardly offset at the upper end portions thereof to provide guides 17—17, which cooperate with the guide seats 18—18 at the sides of the bolster 14. The truck springs are composed of two clusters of four springs each, as shown. The springs 16—16 at each side of the truck are supported on the spring plank 15, the usual spring follower plates 19—19 being disposed at the top and bottom of the spring cluster, the same respectively abutting the bolster and spring plank. The springs 16—16 yieldingly support the bolster 14, which, in turn, supports the car body by means of the usual body bolster.

Referring first to the embodiment of the invention illustrated in Figures 1, 2, and 3, my improved snubbing means comprises a pair of friction units carried by the truck bolster, each unit including: a casing A; a pair of wedge blocks B—B within the casing; an outer friction wedge block C having wedging engagement with the blocks B—B and sliding frictional engagement with the corresponding bolster guide of the truck; and a spring D within the casing yieldingly pressing the wedge blocks outwardly.

Each casing A is in the form of a rectangular boxlike member, open at the outer end and closed at the inner end by a transverse wall 20. The side walls of the casing are indicated by 21—21 and the top and bottom walls by 22—22.

The blocks B are all of the same design. Two blocks B—B are associated with each casing. The blocks B—B of each casing are disposed within the casing at the open end thereof and bear on the inner sides of the top and bottom walls 22—22 respectively. Each block B fills the space between the side walls 21—21 of the casing, and has a transverse, flat, rear end face against which the spring D is adapted to bear. The top block B has a flat top face 23 engaging the top wall 22 of the casing, and the bottom block B has a flat bottom face, also indicated by 23, engaging the bottom wall of the casing. The two blocks B—B have opposed, inwardly converging wedge faces 24—24 on the inner sides thereof.

The wedge friction block C of each friction unit has a flat vertical outer friction surface 25 and top and bottom wedge faces 26—26 at the inner end thereof converging inwardly of the mechanism. The wedge block C is engaged between the blocks B—B with the wedge faces 26—26 thereof respectively in engagement with the wedge faces 24—24 of the two blocks B—B.

The spring resistance D of each unit, which is in the form of a single coil is interposed between the rear wall of the casing A and the shoes B—B and is under initial compression when the parts are assembled within the car truck to force the blocks B—B and the wedge friction block C outwardly.

The two friction units are carried by the truck bolster and are housed within the core openings thereof. The bolster 14 illustrated in the drawing is of standard design, having core openings 27—27 extending lengthwise of the bolster and separated by a vertical wall or web 28 extending lengthwise of said bolster. In carrying out my invention I provide openings 29—29 through the inner walls of the guide seats 18—18 of the bolster. The openings 29—29 are of square outline, as clearly shown in Figure 3 and are in alignment with the guides 17—17 of the corresponding truck side frame.

The friction units are disposed within the bolster at opposite sides of the wall 28, the casing A of each unit being of such a size as to fit within the core opening at either side of the wall 28, as clearly shown in Figures 1 and 2. The inner ends of the casings A—A abut opposite sides of the wall 28 and the wedge friction blocks C—C of the two units project through the openings 29—29 and against the bolster guides 17—17, the friction surfaces 25—25 at the outer ends of said blocks being pressed into frictional contact with the flat guide surfaces of the bolster guides 17—17.

The casings A—A are preferably fixed to the bolster 14 by being welded thereto, as indicated at 30.

The operation of my improved snubbing mechanism is as follows: As the bolster moves vertically during compression and expansion of the truck springs, the oscillations of the springs are retarded and dampened by the frictional resistance between the bolster guides and the friction wedge blocks C—C as the friction units move downwardly and upwardly with the bolster. Inasmuch as the springs D—D are under initial compression, the wedge blocks B—B of the friction units are pressed outwardly and the blocks C—C are squeezed out between the wedge blocks B—B, thereby pressing the blocks C—C against the friction surfaces of the bolster guides 17—17 with substantially constant pressure. As will be evident, the frictional resistance produced is thus substantially uniform during the range of up and down movement of the bolster.

Referring next to the embodiment of the invention illustrated in Figure 4, the design is substantially the same as that hereinbefore described with the exception that the enclosing casings of the friction units are omitted, the core openings of the bolster serving as chambers for housing the elements of the friction units.

Each friction unit, as shown in Figure 4, comprises two wedge blocks E—E, an outer friction wedge block F, and a spring G. The blocks E—E are of substantially the same design as the blocks B—B hereinbefore described, with the exception that the former have seats 31—31 at their inner ends within which the forward end of the spring G is seated. The blocks E—E of each unit have their forward ends projecting into the opening 29 of the bolster and are held in position between the top and bottom walls of said opening, these walls of the opening acting as guides for said blocks. The inner ends of the springs G—G of the two units abut opposite sides of the wall or web 28 of the bolster, and inasmuch as these springs are under initial compression between said wall 28 and the blocks E—E, the latter are at all times pressed outwardly and the friction wedge blocks F—F are squeezed out between said blocks E—E and E—E against the friction surfaces of the guides 17—17 in the same manner as the blocks C—C hereinbefore described.

I have herein shown and described what I now consider the preferred manner of carrying out my invention, but the same is merely illustrative and I contemplate all changes and modifications that come within the scope of the claims appended hereto.

I claim:

1. In a railway car truck, including a truck frame having vertical bolster guides thereon, the combination with a bolster vertically movable between said guides; of friction units mounted within said bolster at opposite sides of the same, each friction unit including a friction wedge block having a flat, outer friction surface slidably engaging the corresponding bolster guide and a pair of inner wedge faces at opposite sides of said block, a pair of sliding wedge blocks embracing said first named block, said wedge blocks having wedge faces in wedging engagement with the wedge faces of said friction wedge block, and spring means for forcing said wedge blocks outwardly against said friction wedge block.

2. In a railway car truck, including a truck frame having vertical bolster guides thereon, the combination with a hollow bolster; of a pair of casings carried by the bolster at respectively opposite sides thereof; a friction wedge block within each casing at the outer end thereof, the friction wedge blocks of said two casings respectively engaging said bolster guides and having frictional sliding movement on said guides; a pair of wedge blocks within each casing embracing the friction wedge block of said casing therebetween, said wedge blocks having wedging engagement with said friction wedge block; and spring means within each casing pressing said wedge blocks outwardly.

3. In a railway car truck, including a truck frame having vertical bolster guides thereon, the combination with a hollow bolster presenting interior chambers at opposite sides thereof; of a friction unit within each chamber of the bolster, each of said units including a friction casing open at the outer end, a friction wedge block within said casing at the open end thereof, said block projecting outwardly of the bolster against the corresponding bolster guide, a pair of wedge blocks within the casing embracing said friction wedge block and in wedging engagement therewith, said wedge blocks being confined between opposite walls of the casing, and spring means under initial compression within each casing bearing on said wedge blocks.

4. In a railway car truck, including a truck frame having vertical bolster guides thereon, the combination with a hollow bolster having side walls provided with openings therethrough, said hollow bolster being divided into two chambers by a central wall; of a casing within each chamber of the bolster, said casing being open at one end and closed at the other end, said closed end of the casing bearing on said central wall of the bolster; a friction wedge block within each casing at the open end thereof, said friction wedge block projecting through the opening of the corresponding side wall of the bolster into tight frictional engagement with the corresponding bolster guide; a pair of wedge blocks within each casing at opposite sides of said friction wedge block, said wedge blocks having wedging engagement with said friction wedge block to force the latter outwardly, said wedge blocks being confined between opposite walls of the casing; and a spring within each casing interposed between the closed end of said casing and the wedge blocks.

5. In a railway car truck, including a truck frame having vertical bolster guides thereon, the combination with a hollow bolster having side walls provided with openings therethrough, each of said openings being defined by side, top, and bottom walls, said hollow bolster being divided into two chambers by a central wall; of a pair of friction wedge blocks at opposite sides of the bolster, each of said blocks having inwardly converging wedge faces at the inner end thereof and a transverse outer friction surface engaging the corresponding bolster guide, each of said friction wedge blocks having the inner end thereof projecting into the corresponding opening of the bolster; a pair of wedge blocks within the opening at each side of the bolster, said blocks being disposed at opposite sides of the corresponding friction wedge block, and having wedge faces engaging the wedge faces of said block, each pair of wedge blocks being confined between opposite walls of the opening at the corresponding side of the bolster; and spring means interposed between each pair of wedge blocks and the central wall of the bolster, said springs being under initial compression.

6. In a railway car truck, including a truck frame having vertical bolster guides thereon, the combination with a hollow bolster presenting interior chambers at opposite sides thereof; of a friction unit within each chamber, each unit including a pair of sliding wedge blocks, a friction shoe between the blocks of said pair and in wedging engagement with the latter, said friction shoe projecting outwardly of the bolster and bearing on the corresponding bolster guide; and spring means forcing said wedge blocks of each pair outwardly against the friction shoe to press the latter against the corresponding bolster guide.

7. In a railway car truck, including a truck side frame having vertical bolster guides thereon, the combination with a bolster presenting an interior chamber at one side thereof; of a friction unit within said chamber, said unit including a pair of sliding wedge blocks, and a friction shoe between the blocks of said pair and in wedging engagement with the latter, said friction shoe projecting outwardly of said bolster and bearing on the corresponding bolster guide; and spring means forcing said wedge blocks of said pair outwardly against the friction shoe to press the latter against said corresponding bolster guide.

LEONARD A. MARQUARDT.